(12) United States Patent
Budge et al.

(10) Patent No.: US 10,945,414 B2
(45) Date of Patent: Mar. 16, 2021

(54) DOG BANDANA

(71) Applicant: Banded Pines LLP, Nampa, ID (US)

(72) Inventors: Kimberley Budge, Idaho Falls, ID (US); Rhonda Budge, Nampa, ID (US)

(73) Assignee: Banded Pines LLP, Nampa, ID (US)

( * ) Notice: Subject to any disclaimer, the term of this patent is extended or adjusted under 35 U.S.C. 154(b) by 0 days.

(21) Appl. No.: 15/973,387

(22) Filed: May 7, 2018

(65) Prior Publication Data

US 2019/0053468 A1 Feb. 21, 2019

Related U.S. Application Data

(60) Provisional application No. 62/546,964, filed on Aug. 17, 2017.

(51) Int. Cl.
*A01K 27/00* (2006.01)
*A44B 11/22* (2006.01)

(52) U.S. Cl.
CPC .......... *A01K 27/006* (2013.01); *A01K 27/001* (2013.01); *A44B 11/22* (2013.01)

(58) Field of Classification Search
CPC .. A01K 27/006; A01K 27/001; A01K 13/006; A42B 5/00; A42B 7/00; A41D 23/00; A41D 13/11; A41D 25/003; A42C 5/00; A45D 8/36
USPC ............. 2/207, 336, 337, 206, 171
See application file for complete search history.

(56) References Cited

U.S. PATENT DOCUMENTS

| | | | |
|---|---|---|---|
| D110,162 S * | 6/1938 | Wyner | D2/500 |
| 2,574,208 A * | 11/1951 | Crowthers | A42B 1/045 |
| | | | 2/207 |
| 3,542,041 A * | 11/1970 | Mercorella | A45D 8/34 |
| | | | 132/275 |
| 4,924,815 A | 5/1990 | Halla | |
| 5,329,885 A | 7/1994 | Sporn | |

(Continued)

FOREIGN PATENT DOCUMENTS

| | | |
|---|---|---|
| CA | 2535207 | 11/2006 |
| DE | 202004004503 | 7/2004 |

(Continued)

OTHER PUBLICATIONS

"Bandana Pet Collar Roco", Dowlis Inspired Branding Inc., accessed Jul. 12, 2017, in 2 pages, available from internet at http://www.dowliseu.com/products/name/bandana-pet-collar-roco/product_id/239769?size=&start=0.

(Continued)

*Primary Examiner* — Magdalena Topolski
*Assistant Examiner* — Katelyn T Truong
(74) *Attorney, Agent, or Firm* — Knobbe, Martens, Olson & Bear, LLP

(57) ABSTRACT

An accessory, such as a bandana or collar, for an animal, such as a dog, is provided. A bandana can have a triangular fabric body. A strap is attached to each of two ends or corners of the body such that each strap forms a loop. An elastic band extends through the loops of the straps and is formed into a closed loop shape. The elastic band non-releasably couples the two straps and therefore the two ends or corners of the body such that the bandana forms an overall closed loop shape. The elastic band can stretch to allow the bandana to slide over the dog's head and to adapt to the size of the dog's neck.

20 Claims, 5 Drawing Sheets

(56) References Cited

U.S. PATENT DOCUMENTS

| | | | | |
|---|---|---|---|---|
| 5,915,535 | A * | 6/1999 | Henrekin-Jordan | A41F 9/002 2/171 |
| 6,519,778 | B2 * | 2/2003 | Arias | A41D 23/00 2/207 |
| 6,523,182 | B1 * | 2/2003 | Brawner | A01K 13/006 2/207 |
| 6,662,755 | B2 | 12/2003 | Kato | |
| 6,708,650 | B1 | 3/2004 | Yates | |
| 7,117,659 | B1 * | 10/2006 | Grogoza | A01K 27/005 54/79.4 |
| D615,712 | S | 5/2010 | Peterson | |
| 2003/0066494 | A1 * | 4/2003 | Hippensteel | A01K 27/003 119/792 |
| 2008/0134990 | A1 * | 6/2008 | Schwarz | A01K 13/006 119/815 |
| 2009/0101162 | A1 * | 4/2009 | Hsu | A45D 8/36 132/273 |
| 2009/0159016 | A1 * | 6/2009 | Lang | A01K 27/006 119/863 |
| 2010/0006039 | A1 * | 1/2010 | Edwards | A01K 13/006 119/850 |
| 2010/0024744 | A1 | 2/2010 | Baillie | |
| 2010/0212601 | A1 * | 8/2010 | Hurwitz | A01K 27/004 119/794 |
| 2010/0306902 | A1 * | 12/2010 | Bourque | A41D 27/08 2/244 |
| 2013/0291806 | A1 * | 11/2013 | Fisher | A01K 29/00 119/855 |
| 2015/0114311 | A1 | 4/2015 | Lynch | |
| 2016/0235038 | A1 | 8/2016 | Sinko | |
| 2016/0324288 | A1 * | 11/2016 | Castro-King | A45D 8/36 |
| 2017/0251640 | A1 * | 9/2017 | Eastman | F16G 11/101 |

FOREIGN PATENT DOCUMENTS

| | | |
|---|---|---|
| EM | 004017465-0001 | 5/2017 |
| FR | 2409711 A1 | 6/1979 |
| FR | 2879894 A1 | 6/2006 |
| FR | 2888719 B1 | 2/2011 |
| GB | 831822 | 3/1960 |
| JP | 3112030 U | 7/2005 |
| JP | D1412956 | 5/2011 |
| WO | WO D042605-005 | 3/1998 |
| WO | WO 2013/133918 | 9/2013 |

OTHER PUBLICATIONS

Fall Winter 2010 collection scarves at FSH, PurseForum, posted Jul. 19, 2010, in 23 pages, available from internet at https://forum.purseblog.com/threads/fall-winter-2010-collection-scarves-at-fsh.585183/page-70#post-16025626.

Scarf Rings, Naver Blog, published Mar. 1, 2017, in 18 pages, available from internet at https://m.blog.naver.com/PostView.nhn?blogId=i_love_living&logNo=220946982362&proxyReferer=http%3A%2F%2Fwww.google.com%2Furl%3Fsa%3Dt%26rct%3Dj%26q%3D%26esrc%3Ds%26source%3Dweb%26cd%3D120%26ved%3D2ahUKEwj4kvGjrbfgAhVFb60KHYgiBQw4bhAWMAI6BAgCEAE%26url%3Dhttp%253A%252F%252Fm.blog.naver.com%252Fi_love_living%252F220946982362%26usg%3DAOvVaw0tuHvsKGKRZHZeFZ_qevV9.

"Star Spangled", How Deep Is the Closet, published Jul. 8, 2011, in 1 page, available from internet at http://howdeepisthecloset.blogspot.com/2011/07/star-spangled.html#!/2011/07/star-spangled.html.

\* cited by examiner

DOG BANDANA

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the priority benefit of U.S. Provisional Application No. 62/546,964, filed Aug. 17, 2017, the entirety of which is hereby incorporated by reference herein.

BACKGROUND

Field

The present disclosure generally relates to accessories for animals. More specifically, the present disclosure relates to bandanas or collars for animals, such as dogs.

Description of the Related Art

Various accessories, such as collars and bandanas, are currently available for animals such as dogs and cats. These collars and bandanas are typically secured and adjusted via a buckle, tie, hook and loop closure, or another releasable attachment mechanism that allows two ends of the collar or bandana to be separated, adjusted, and attached.

SUMMARY

The bandanas described herein can advantageously be placed on and removed from an animal, such as a dog, without a releasable attachment mechanism. The bandanas can resist twisting in use. The bandanas can be made of materials that advantageously are water-resistant, durable, and easy to clean.

In some aspects, a bandana for an animal includes a flat triangular flexible body, two flat straps, and an elastic cord. The triangular body is sized and shaped to fit around a portion of a neck of an animal. The flat straps have a width and length configured to reduce twisting of the strap body when located on the neck of the animal. A first of the two straps is attached to a first corner of the triangular body, and a second of the two straps is attached to a second corner of the triangular body. Each strap is attached to the respective corner of the triangular body such that each strap forms a loop. The elastic cord extends through the loops of the two straps and is formed into a loop shape to non-releasably couple the two straps such that the bandana forms an overall loop shape sized to fit over a head of a dog in a stretched configuration and the neck of the dog in an unstretched configuration such that the bandana is fitted about the neck of the animal.

The body can be made of fabric. For example, the body can be made of a polyester canvas fabric. Edges of the body can be bias taped. The straps can be made of polyester webbing coated with TPU or PVC. The elastic cord can be shock cord. The elastic cord can be held in the loop shape with one or more steel wires. The elastic cord can be held in the loop shape with one or more hog ties.

In some aspects, a bandana for an animal includes a body, two straps, and an elastic cord. One of the straps is attached to each of two ends of the body. The elastic cord extends between and non-releasably couples the two straps such that the bandana forms an overall closed loop shape. The body can be triangular, and the straps can be attached to two corners of the triangular body. The body can be made of fabric. For example, the body can be made of a polyester canvas fabric. Edges of the body can be bias taped. The straps can be made of polyester webbing coated with TPU or PVC. The elastic cord can be shock cord. The elastic cord can be formed into a loop shape. The elastic cord can be held in the loop shape with one or more steel wires. The elastic cord can be held in the loop shape with one or more hog ties.

In some aspects, a method of manufacturing a bandana for an animal includes sizing and shaping fabric to provide a flat triangular flexible body sized and shaped to fit around a portion of a neck of an animal; shaping an elastic cord into a loop; looping a first flat strap through the looped elastic cord; attaching the first flat strap to a first corner of the body; looping a second flat strap through the looped elastic cord; and attaching the second flat strap to a second corner of the body such that the body, elastic cord, and first and second straps form an overall loop shape.

The method can further include securing the elastic cord in the loop shape with steel wires. The method can also include positioning the looped elastic cord such that the steel wires are disposed in the loop of one of the first and second straps.

All of these embodiments are intended to be within the scope of the disclosure herein. These and other embodiments will become readily apparent to those skilled in the art from the following detailed description having reference to the attached figures, the disclosure not being limited to any particular disclosed embodiment(s).

BRIEF DESCRIPTION OF THE DRAWINGS

These and other features, aspects, and advantages of the present disclosure are described with reference to the drawings of certain embodiments, which are intended to schematically illustrate certain embodiments and not to limit the disclosure.

DETAILED DESCRIPTION

Although certain embodiments and examples are described below, those of skill in the art will appreciate that the disclosure extends beyond the specifically disclosed embodiments and includes other combinations features of the disclosed embodiments, modifications and equivalents thereof. Thus, it is intended that the scope of the disclosure herein disclosed should not be limited by any particular embodiments described below.

Figure 2:
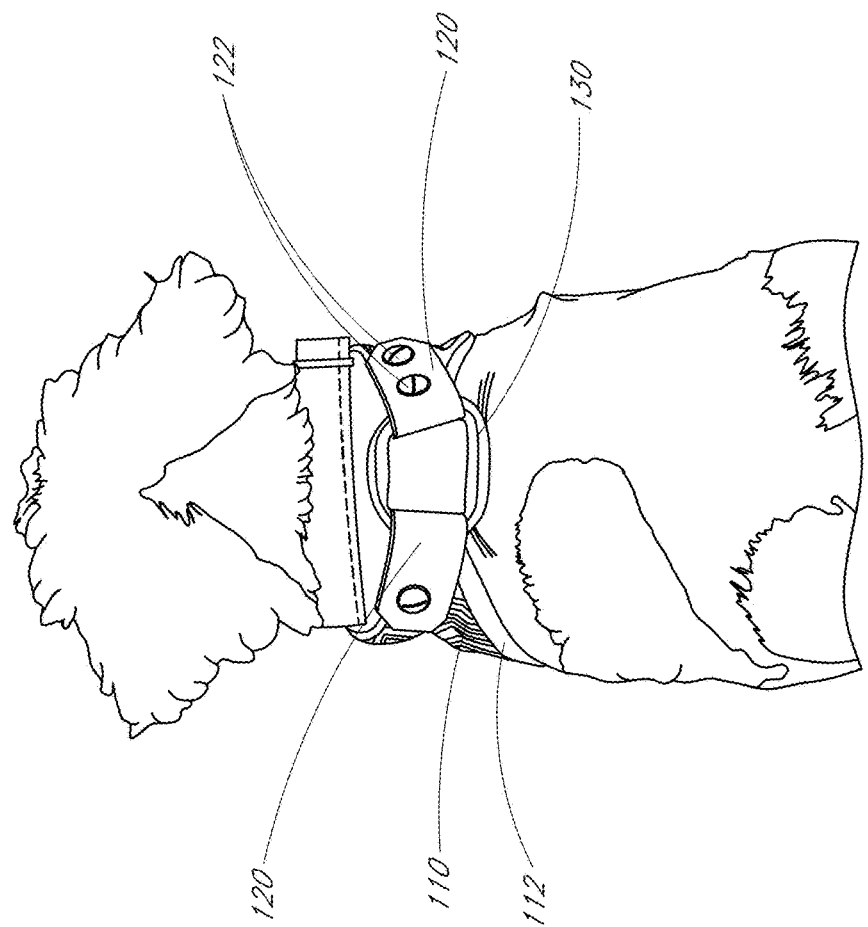
FIG. 2 illustrates a rear view of the dog wearing the dog bandana of FIG. 1.
Figure 1:
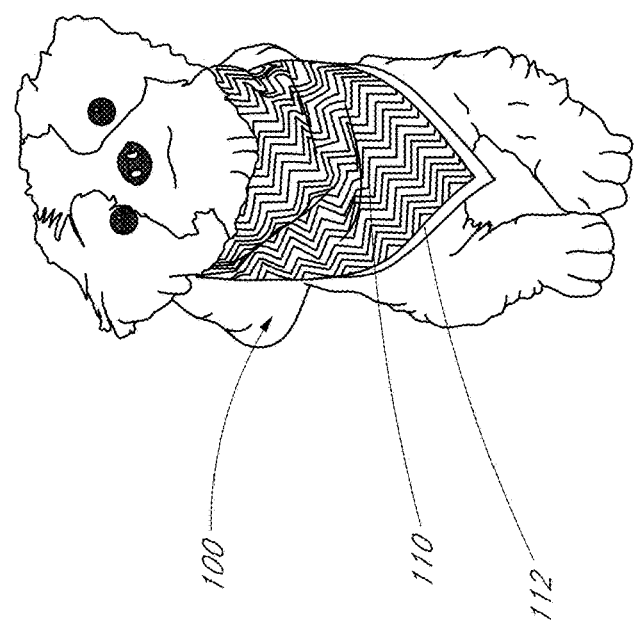
FIG. 1 illustrates a front view of a dog wearing an example embodiment of a dog bandana.
Figure 4:
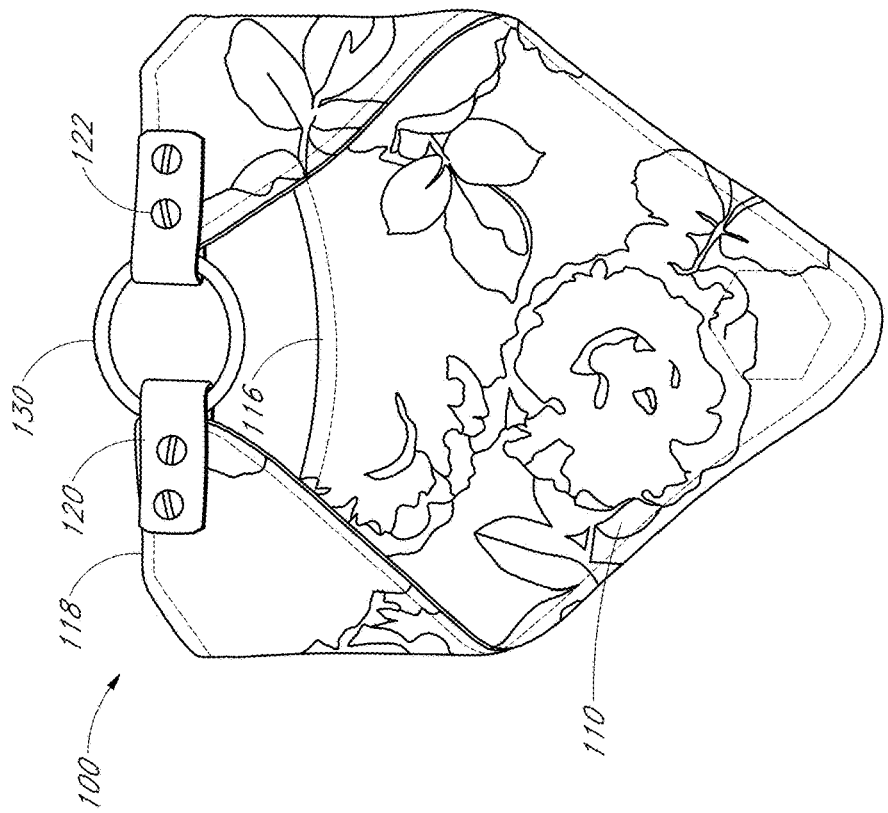
FIG. 4 illustrates a rear view of the bandana of FIG. 3.
Figure 3:
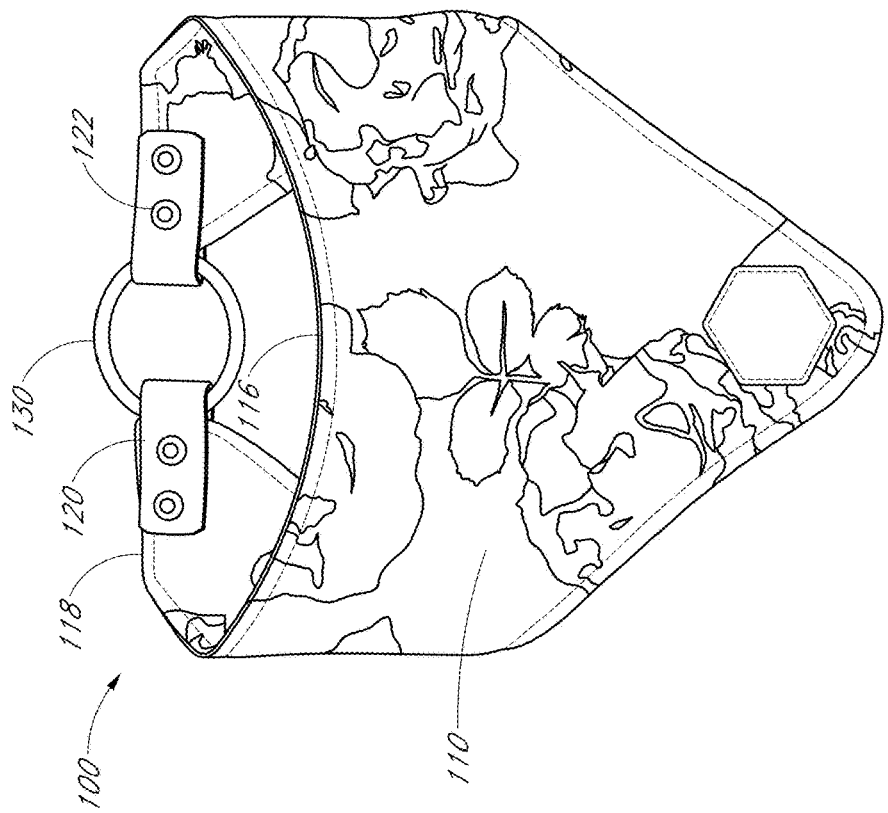
FIG. 3 illustrates a front view of an example embodiment of a dog bandana.
Figure 4A:
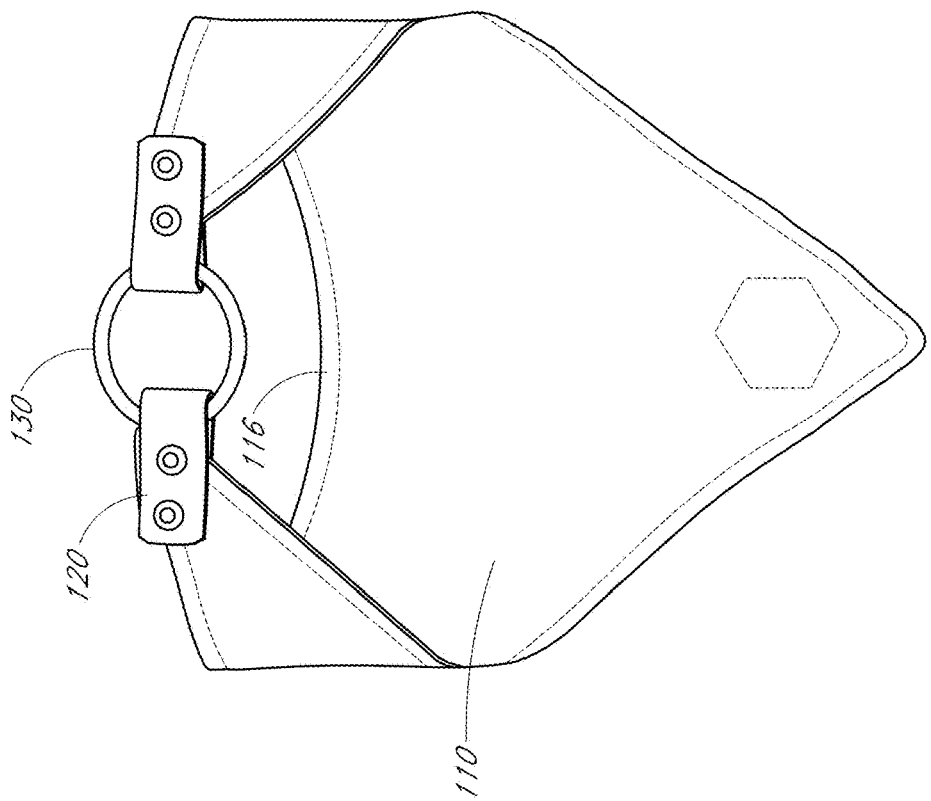
FIG. 4A illustrates a rear view of the bandana of FIG. 3A.
Figure 3A:
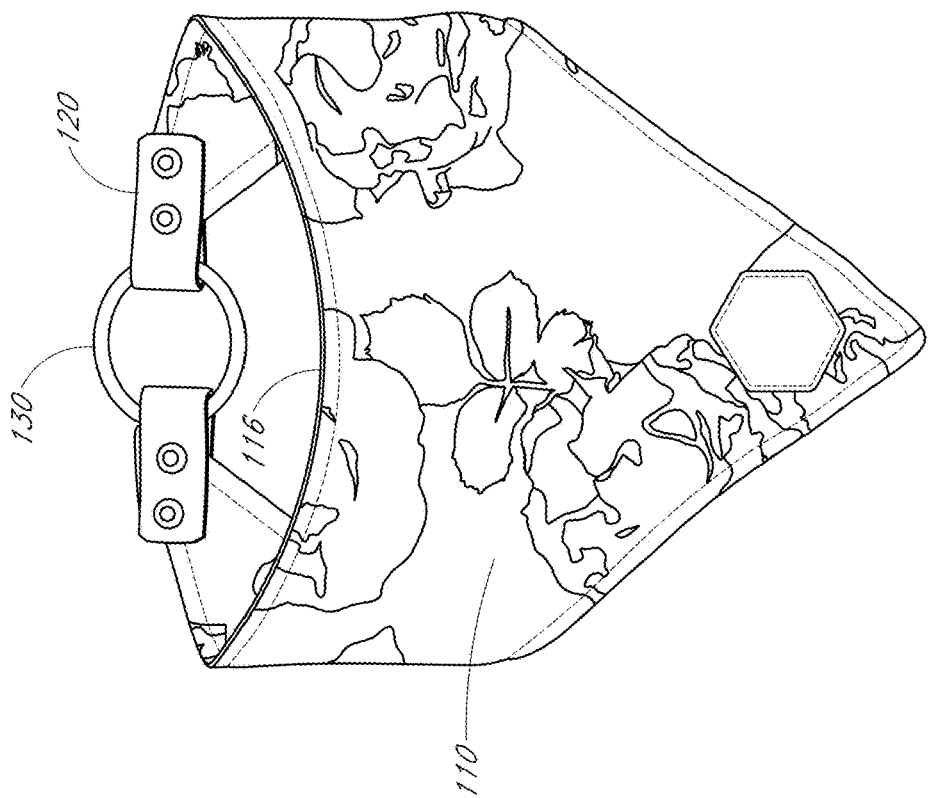
FIG. 3A illustrates a front view of an example embodiment of a dog bandana.
Figure 6:
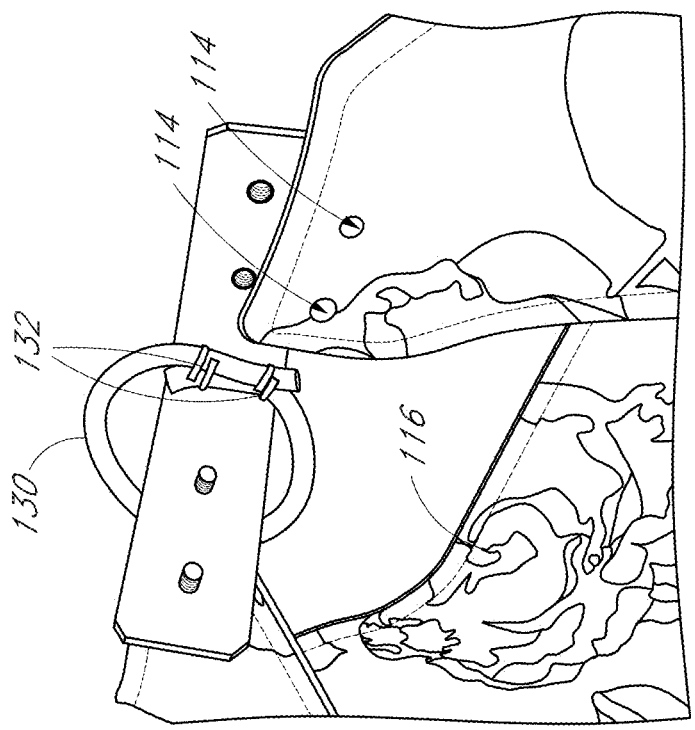
FIG. 6 illustrates the straps and elastic band of FIG. 5 during assembly.
Figure 5:
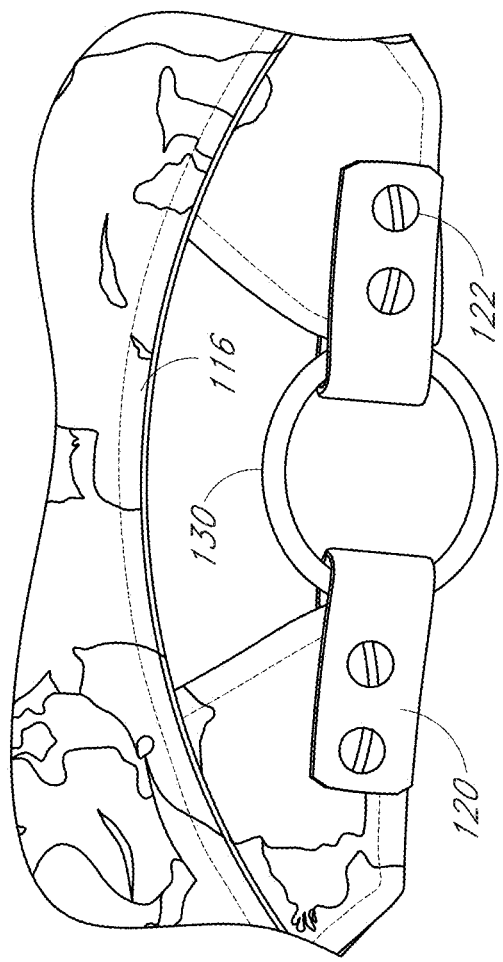
FIG. 5 illustrates a close-up of straps and an elastic band or cord of the bandana of FIG. 3.
Figure 7:
FIG. 7 illustrates a partial front perspective view of another dog wearing an example embodiment of a dog bandana.

FIGS. 1-7 illustrate bandanas 100 for a dog or other animal which include a body 110, two straps 120, and an elastic band or cord 130. FIGS. 3-6 illustrate an example bandana 100, and FIGS. 1-2 and 7 illustrate example bandanas 100 worn by dogs. The body 110 (when in a flat, pre-assembled state) can be triangular or generally triangular as shown, although other shapes are also possible, including square, circular, semi-circular, rectangular or any other shape. One or more corners of the body 110 can be rounded, for example as shown in FIGS. 3 and 4, or more pointed or angular, for example as shown in FIGS. 1, 3A, and 4A. When placed on a dog or other animal, one corner of the triangular body 110 is positioned downward (for example, pointing toward the animal's legs) and the side or edge of the triangle opposite the downward pointing corner extends circumferentially around or along the animal's neck. The side that extends circumferentially around or along the animal's neck in use can have a rounded or scooped profile or shape. The rounded or scooped profile or shape can advantageously provide a better fit and/or improved comfort for the animal. A central portion 116 of the side that extends circumferentially around or along the animal's neck in use can be rounded or scooped as shown in FIGS. 3-4A. End portions 118 of the side that extends circumferentially around or along the animal's neck in use can be straight as shown in FIGS. 3-4A.

A strap 120 is attached to each end of the body 110. For example, as illustrated in FIGS. 1-5, one strap 120 is attached adjacent to each corner of the side of the triangular body 110 that extends around or along the animal's neck in use. The end portions 118 of the side of the body 110 that extends around or along the animal's neck in use can have a length such that the end portions 118 extend beyond the straps 120 when the straps 120 are attached to the body 110, as shown in FIGS. 3 and 4. Alternatively, the end portions 118 can have a length such that the end portions 118 do not extend beyond the straps 120, as shown in FIGS. 3A and 4A. The straps 120 can be attached to the body 110 with, for example, one or more screw post rivets 122 that extend through one or more corresponding holes 114 (shown in FIG. 6) in the body 110. Using screw post rivets 122 to attach the straps 120 can provide durability to the bandana 100. The rivets 122 can be made of metal, which can provide durability. The rivets 122 may be secured to the straps 120 and/or body 110 such that the rivets 122 cannot be, or are not intended to be, removed by a user. The rivets 122 may be removable and/or replaceable, for example, by the manufacturer, for repairs. Each strap 120 is looped back on itself such that both ends of the strap are attached to the body 110 and each strap 120 forms a loop. Each strap 120 can have a width of about 1 inch. Each strap 120 can have a full length of about 5 inches such that when the strap 120 is looped back on itself, the folded or looped strap 120 has a length of about 2.5 inches.

The elastic band or cord 130 extends through the loops of both straps 120 and is formed into a loop shape as shown. The straps 120 and looped elastic band or cord 130 are oriented such that the looped elastic band or cord 130 lies parallel to and/or flush with the back of the animal's neck in use, as shown in FIG. 2. Ends of the elastic band or cord 130 can be connected with steel wire(s) 132 to form a loop shape as shown in FIG. 6. For example, the steel wire(s) can be hog rings.

To make the bandana 100, the desired material for the body 110 can be cut to shape and sewn as needed. For example, for a triangular body 110, the material can be cut into a square, which is then cut in half diagonally to form two triangular pieces. The triangular pieces are sewn together. For example, the triangular pieces can be placed with right sides together and sewn together, then turned right side out. The holes 114 are formed proximate ends of the body 110. For example, the holes 114 can be punched in the body 110. Corresponding holes are formed (for example, punched) in the straps 120. If two holes 114 are formed proximate each end of the body 110, four holes are formed in each strap 120. To assemble the bandana 100, the elastic band or cord 130 can be formed into the loop shape, and then the straps 120 can be looped through the looped elastic band or cord 130 and attached to the body 110. Alternatively, one of the straps 120 can be folded in half and attached to one end of the body 110, the elastic band or cord 130 can be looped through the loop of the strap 120 and formed into the loop shape with the steel wires (before or after attaching the first strap 120 to the body 110), and then the other strap 120 can be looped through the looped elastic band or cord 130, folded over the steel wires, and attached to the other end of the body 110. As another alternative, both straps 120 can first be attached to the body 110, then the elastic band or cord 130 can be looped through the two straps 120 and formed into the loop shape. When the bandana 100 is assembled, the steel wire(s) 132 are disposed within the loop of one of the straps 120 so that the steel wire(s) 132 are covered and hidden by the strap 120. The elastic band or cord 130 connects the two straps 120 and therefore the two ends of the body 110 so that the bandana has an overall closed loop shape.

Both ends of both straps 120 are permanently attached to the body 110 with the elastic band or cord 130 extending through the straps 120. In other words, the body 110, straps 120, and elastic band or cord 130 are permanently or non-releasably coupled. The bandana 100 therefore always maintains the continuous closed loop shape. For use, a user slides the bandana over a dog's (or other animal's) head to rest around the dog's neck. The elastic band or cord 130 can stretch to enlarge the loop of the bandana 100 and allow the bandana 100 to fit over the dog's head during donning and doffing and to adapt to the size of the dog's neck. The bandana 100 can be provided in multiple sizes, for example a size for smaller dogs and a larger size for larger dogs. If multiple sizes are provided, the bandanas 100 can be sized such that only the size of the body 110 varies for different bandana 100 sizes, and the size of the straps 120 and/or elastic band or cord 130 remains constant across different sizes. If multiple sizes are provided, the elastic band or cord 130 can be provided in different sizes. For example, the elastic band or cord 130 can have a length of 7 inches prior to being formed in the loop for a smaller size and a length of 10 inches prior to being formed in the loop for a larger size. Other lengths are also possible.

The body 110 can be made of fabric. For example, the body 110 can be made of a polyester-based canvas fabric. Polyester can advantageously provide the body 110 with water resistant properties. The fabric can resist stretching. Resisting stretching can advantageously help the body 110 maintain its shape. As shown in FIGS. 1-7, the body 110 can be provided in a variety of designs, patterns, and/or colors. The body 110 can be made of or include multiple layers. For example, the body 110 can have front and back layers that are sewn together. The front and back layers can be made of the same or different fabrics. The front and back layers can have the same (for example, as shown in FIGS. 3 and 4) or different designs, patterns, and/or colors (for example as shown in FIGS. 3A and 4A). One or more sides or edges of the body 110 can be finished or edged with a trim 112 as shown in FIGS. 1-2. The trim 112 can be made of, for example, fabric, leather, faux leather, or another appropriate material. The trim 112 can be bias taped. The elastic band or cord 130 can be made of shock cord or bungee cord, for example, military-grade shock or bungee cord. The shock or bungee cord can be held in the loop shape with steel wire. The properties, for example, stiffness, loop shape, and orientation of the straps 120 and/or elastic band or cord 130 can advantageously inhibit the cord 130 and straps 120 from twisting as the dog moves in use. The shock or bungee cord can also be waterproof or water resistant. In contrast, a standard consumer grade elastic may wear and eventually fail with excess exposure to water. The straps 120 can be made of, for example, BioThane, or polyester webbing coated with TPU or PVC, which is advantageously durable, easy to clean, and waterproof.

Figure 8:
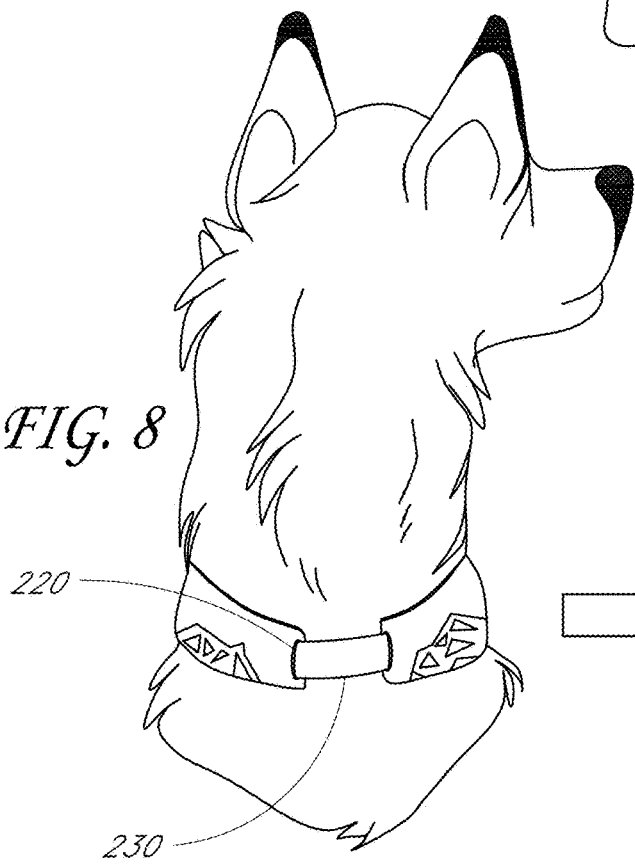
FIG. 8 illustrates a partial rear view of a dog wearing another example embodiment of a dog bandana.
Figure 9:
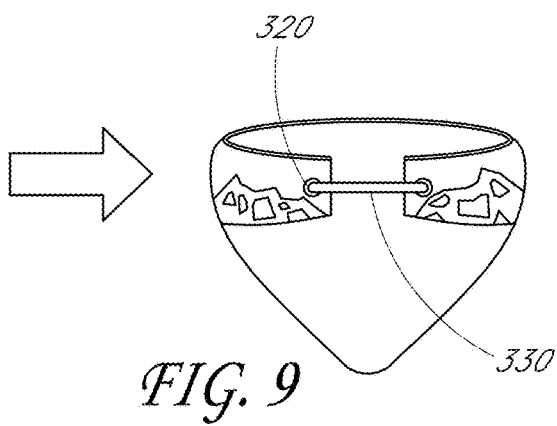
FIG. 9 illustrates a rear view of another example embodiment of a dog bandana.

FIGS. 8 and 9 illustrate alternative connection mechanisms for securing the ends of the body 110 together rather than the straps 120 and elastic band or cord 130. In FIG. 8, holes surrounded by grommets 220 are positioned adjacent or proximate the ends of the body 110. An elastic strap 230 extends through and/or is coupled to the grommets 220 to connect the ends of the body 110. The grommets 220 can be oval as shown. The grommets 220 can be made of, for example, plastic or metal. FIG. 9 illustrates a connection mechanism including circular grommets 320 and a band of elastic 330 extending therebetween. The elastic can be braided and/or waterproof. Similar to the straps 120 and elastic band or cord 130 of FIGS. 1-2, the connection mechanisms of FIGS. 3 and 4 allow ends of the body 110 to be permanently or non-releasably coupled, and the elastic 230, 330 can stretch to enlarge the loop of the bandana 100 and allow the bandana 100 to fit over the dog's head during donning and doffing and to adapt to the size of the dog's neck. However, the properties, size, shape, and/or orientation of the straps 120 and looped elastic band or cord 130 can advantageously provide improved resistance to twisting in use.

Although a bandana 100 for a dog has been shown and described herein, the bandana could be sized or otherwise adapted for use with other animals, for example cats. Additionally, the body 110 could take the form or shape of a collar (for example, a rectangular strip) rather than a bandana.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount.

What is claimed is:

1. A bandana for an animal, the bandana comprising:
a flat triangular flexible body sized and shaped to fit around a portion of a neck of the animal, the body comprising an outer surface and an inner surface facing the animal, in use;
two flat straps having a width and length, a first of the two flat straps attached to a first corner of the body by a first metal rivet and a second of the two flat straps attached to a second corner of the body by a second metal rivet; and
a band extending between the two flat straps;
wherein the body, the two flat straps, and the band are non-releasably coupled;

wherein each of the two flat straps has a first end portion and a second end portion, the respective rivet non-releasably attaching the first end portion of said strap to the inner surface of the body and the second end portion of said strap to the outer surface of the body such that the first end portion of said strap is positioned between the body and the animal, in use.

2. The bandana of claim 1, wherein the body is made of fabric.

3. The bandana of claim 1, wherein the body is made of a polyester canvas fabric.

4. The bandana of claim 1, wherein edges of the body are bias taped.

5. The bandana of claim 1, wherein the two flat straps are made of polyester webbing coated with thermoplastic polyurethane or polyvinyl chloride.

6. The bandana of claim 1, wherein the band is shock cord.

7. The bandana of claim 1, wherein the band is held in a loop shape with one or more steel wires.

8. The bandana of claim 1, wherein the elastic cord is held in the loop shape with one or more hog rings.

9. A bandana for an animal, the bandana comprising:
a body;
two straps, each strap attached to one of two ends of the body by a metal rivet, each strap is attached to the respective end of the body such that each of the two flat straps forms a loop; and
an elastic cord extending between and non-releasably coupling the two straps such that the bandana forms an overall closed loop shape, the elastic cord comprising a first end and a second end held together in a loop shape, the first end and the second end of the elastic cord being disposed within the loop formed by one of the two flat straps such that the first end and the second end of the elastic cord are covered and hidden by the one of the two flat straps,
wherein the body, the flat straps, and the elastic cord are non-releasably coupled.

10. The bandana of claim 9, wherein the body is triangular and the two straps are attached to two corners of the body.

11. The bandana of claim 9, wherein the body is made of fabric.

12. The bandana of claim 9, wherein the body is made of a polyester canvas fabric.

13. The bandana of claim 9, wherein edges of the body are bias taped.

14. The bandana of claim 9, wherein the two straps are made of polyester webbing coated with TPU or PVC.

15. The bandana of claim 9, wherein the elastic cord is shock cord.

16. The bandana of claim 9, wherein the first end and the second end of the elastic cord are held in the loop shape with one or more steel wires, the one or more steel wires being disposed within the loop formed by one of the two flat straps such that the one or more steel wires are covered and hidden by the one of the two flat straps.

17. The bandana of claim 9, wherein the first end and the second end of the elastic cord are held in the loop shape with one or more hog rings, the hog rings disposed within the loop formed by one of the two flat straps such that the one or more hog rings are covered and hidden by the one of the two flat straps.

18. The bandana of claim 1, wherein each of the two flat straps is attached to the respective corner of the body such that each of the two flat straps forms a loop.

19. The bandana of claim 1, wherein an end of the band is disposed within the loop formed by one of the two flat straps such that the end of the band is covered and hidden by the one of the two flat straps.

20. The bandana of claim 9, wherein the bandana is water resistant.

* * * * *